United States Patent [19]

Rosauer et al.

[11] Patent Number: 5,708,711

[45] Date of Patent: Jan. 13, 1998

[54] METHOD FOR SELECTING A PREFERRED TIME INTERVAL IN WHICH TO UPDATE A COMMUNICATION UNIT PARAMETER

[75] Inventors: Matthew M. Rosauer, Chicago; Paul A. Arnone, Lake in the Hills, both of Ill.

[73] Assignee: Motorola, Inc., Schaumburg, Ill.

[21] Appl. No.: 535,311

[22] Filed: Sep. 27, 1995

[51] Int. Cl.$^6$ ..................................... H04L 9/16
[52] U.S. Cl. ............................................ 380/21
[58] Field of Search ........................... 380/21, 46

[56] References Cited

U.S. PATENT DOCUMENTS

| | | | |
|---|---|---|---|
| 5,091,942 | 2/1992 | Dent | 380/46 |
| 5,237,612 | 8/1993 | Raith | 380/21 |
| 5,241,598 | 8/1993 | Raith | 380/21 |
| 5,325,432 | 6/1994 | Gardeck et al. | 380/21 |
| 5,465,300 | 11/1995 | Altschuler et al. | 380/21 |
| 5,615,266 | 3/1997 | Altschuler et al. | 380/21 |
| 5,619,572 | 4/1997 | Sowa | 380/21 |

*Primary Examiner*—Salvatore Cangialosi
*Attorney, Agent, or Firm*—Christopher P. Moreno

[57] ABSTRACT

For each communication unit (105–108) in a wireless communication system (100), a traffic probability value is determined for each of a plurality of time intervals (400). Additionally, an update preference value is determined for each of the time intervals (402). The traffic probability values and the update preference values corresponding to each time interval are applied to a predetermined function to derive preference grades for each of the time intervals (403). A preferred time interval is selected corresponding to a time interval having the most favorable preference grade (404). In one embodiment of the present invention, the above-described method is incorporated into a key management controller for the update of an encryption key and/or an encryption map index. Updates of communication unit parameters performed during the preferred time intervals have a high likelihood of successful completion.

11 Claims, 2 Drawing Sheets

METHOD FOR SELECTING A PREFERRED TIME INTERVAL IN WHICH TO UPDATE A COMMUNICATION UNIT PARAMETER

FIELD OF THE INVENTION

The present invention relates generally to wireless communication systems and, in particular, to a method for selecting a preferred time interval in which to update a communication unit parameter.

BACKGROUND OF THE INVENTION

Wireless communication systems are well-known. Such systems typically include a plurality of communication units that transceive wireless communication resources with each other and a fixed infrastructure. The fixed infrastructure typically comprises base stations/repeaters that also transceive the wireless communication resources. In some systems, such as a PRIVACY PLUS® system by Motorola, Inc., the base stations operate under the direction of a central controller that controls allocation of the wireless communication resources. Regardless, it is often the case that the communication units include various communication unit parameters used for their normal operation. An example of such a parameter is an encryption key, as known in the art, used for the encryption and decryption of digitally transmitted voice and data communications. Other communication unit parameters are known to require updates, such as inhibit/enable status.

As known in the art, such communication unit parameters need to be updated from time to time. An encryption key is a good example of a communication unit parameter that must be updated relatively frequently in order to maintain proper security levels. Various methods are typically used for updating communication unit parameters. Such methods include "manual" reprogramming and over-the-air rekeying (OTAR) (particularly related to the update of encryption keys). Another method for performing updates of communication unit parameters is discussed in co-pending U.S. patent application Ser. No. 08/534,605, entitled METHOD FOR UPDATING A COMMUNICATION UNIT PARAMETER IN A WIRELESS COMMUNICATION SYSTEM, assigned to Motorola, Inc. and having the same filing date as the instant application, the teachings of which are incorporated herein by reference.

Although there are various methods regarding how updates of communication unit parameters are performed, there currently exist no systematic methods for determining when updates of communication unit parameters should be performed. In current systems, particularly those incorporating encryption keys, updates of communication unit parameters are essentially performed on an "on demand" basis. That is, there is typically no consideration given as to when would be the best time to perform an update in terms of the likelihood that the update will be successful. For example, it is possible that a given communication unit or group of communication units are more likely to be active, and thus more likely to receive any messages pertaining to the update of a communication unit parameter, during certain hours of the day. If an update message is sent at some time other than their most active hours, it is likely that the given communication unit or group of communication units will miss the update message. In turn, it then becomes necessary to resend the update message which results in decreased system efficiency. Therefore, a need exists for a method for selecting a preferred time interval in which to update a communication unit parameter such that updates have a high likelihood of being successfully performed.

DESCRIPTION OF A PREFERRED EMBODIMENT

In general, the present invention provides a method, in a wireless communication system, for selecting a preferred time interval in which to perform an update of a communication unit parameter. For any given communication unit, a traffic probability value is determined for each of a plurality of time intervals. Additionally, an update preference value is determined for each of the time intervals. In one embodiment of the present invention, the time intervals comprise four contiguous six-hour time intervals, and the traffic probability values and the update preference values are inclusively within a range from 0 to 1.

Once determined, the traffic probability values and the update preference values corresponding to each time interval are applied to a predetermined function to derive preference grades for each of the time intervals. A preferred time interval is selected corresponding to a time interval having the most favorable preference grade. In another embodiment of the present invention, the above-described method is incorporated into a key management controller for the update of an encryption key and/or an encryption map index. Using this method, time intervals are selected such that updates of communication unit parameters have a high likelihood of successful completion.

Figure 1:
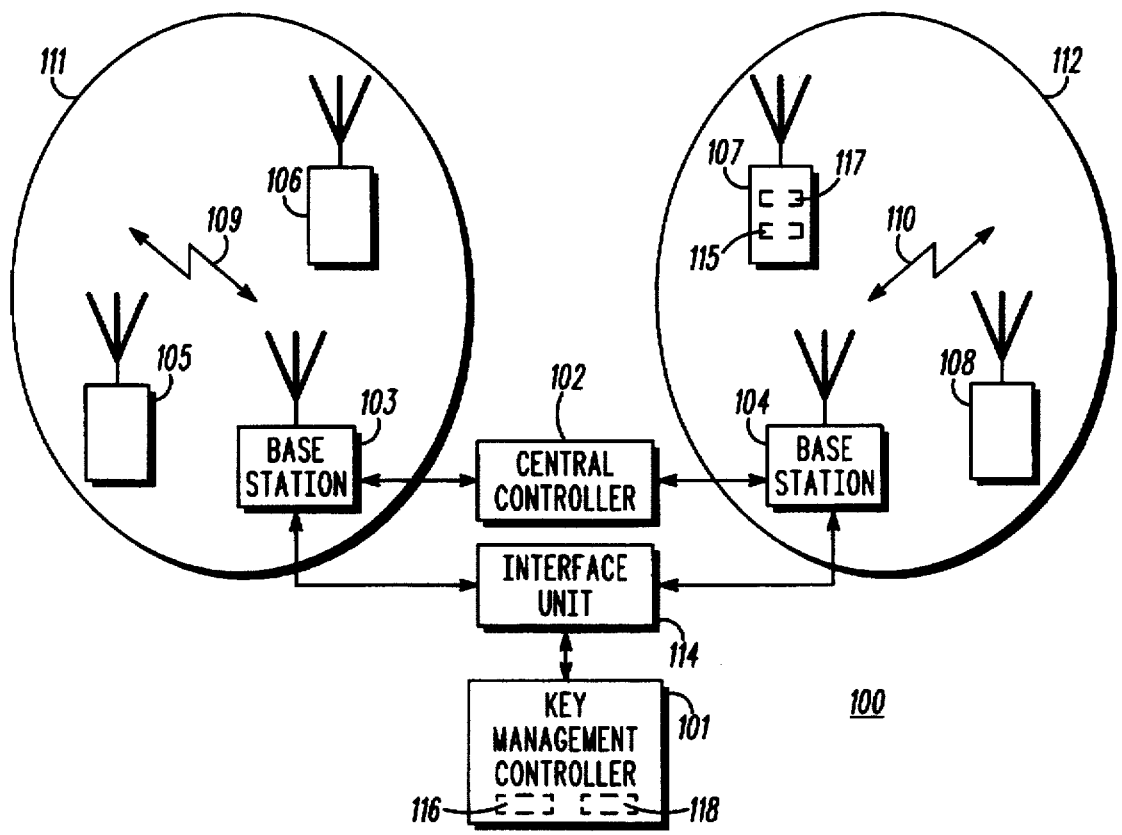
FIG. 1 is a block diagram of a wireless communication system that incorporates a key management controller.

The present invention can be more fully described with reference to FIGS. 1–4. FIG. 1 is a block diagram of a wireless communication system 100 that incorporates a key management controller 101. The wireless communication system 100 also comprises a central controller 102, base stations 103–104, a plurality of communication units 105–108, and wireless communication resources 109–110. In systems operating as trunked communication systems, the central controller 102 controls the allocation of the wireless communication resources 109–110. The wireless communication resources 109–110 may comprise radio frequency (RF) channels such as pairs of frequency carriers, time-division multiplexed (TDM) slots, or any other RF transmission media.

Each base station 103–104, which can be a QUANTAR™ base station by Motorola, Inc., in transceiving the wireless communication resources 109–110 with the communication units 105–108, establishes a corresponding coverage area 111–112. For the sake of clarity, two base stations are shown; in practice any number of base station can be used. In a preferred embodiment, the communication units 105–108 comprise in-hand portable units and/or in-car mobile units capable of encrypted two-way communications, such as ASTRO™ SPECTRA® radios by Motorola, Inc., and are capable of receiving commonly (i.e., group-wide) or individually addressed messages. Although shown in only one for simplicity, each communication unit 105–108 includes memory 115, such as random access memory (RAM) and/or read-only memory (ROM), and a processor 117, such as a microprocessor and/or digital signal processor.

The key management controller 101 communicates with the base stations 103–104 via one or more interface units 114 (only one shown). Suitable key management controllers and interface units are known in the art. The key management controller 101 includes memory 116 and a processor 118 that are, at a minimum, as functionally capable as the memory 115 and processor 117 used in the communication units 105–108. The memories 115–116 and processors 117–118 are used in accordance with well known programming techniques for the storage and execution of software algorithms. In a preferred embodiment, the key management controller 101 generates and stores at least one encryption key in accordance with known encryption techniques. Furthermore, the key management controller 101 generates an encryption map index, as described below.

Figure 2:
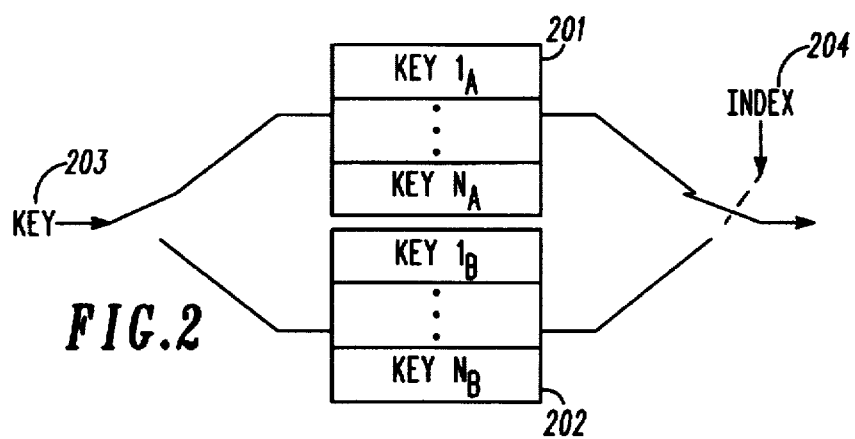
FIG. 2 is a block diagram illustrating storage and selection of encryption keys.

FIG. 2 is a block diagram illustrating storage and selection of encryption keys. The storage and selection shown is implemented using the memories 115 and processors 117 included in each of the communication units 105–108. As shown, a first encryption map 201 and a second encryption map 202 are provided, although any number of such encryption maps could be used. The first encryption map 201 includes a plurality of encryption keys labeled "KEY $i_A$" and the second encryption map 202 includes a plurality of encryption keys labeled "KEY $i_B$", where i=1 to N. As one or more updated encryption keys 203 are received via a group or individual update message, they are stored in either of the encryption maps 201–202. An encryption map index 204 is also received as a communication unit parameter used to indicate that encryption map from which encryption keys are to be selected for the encryption/decryption of voice and data communications. In this manner, keys can be updated without temporarily interrupting encrypted voice and data communications.

Figure 4:
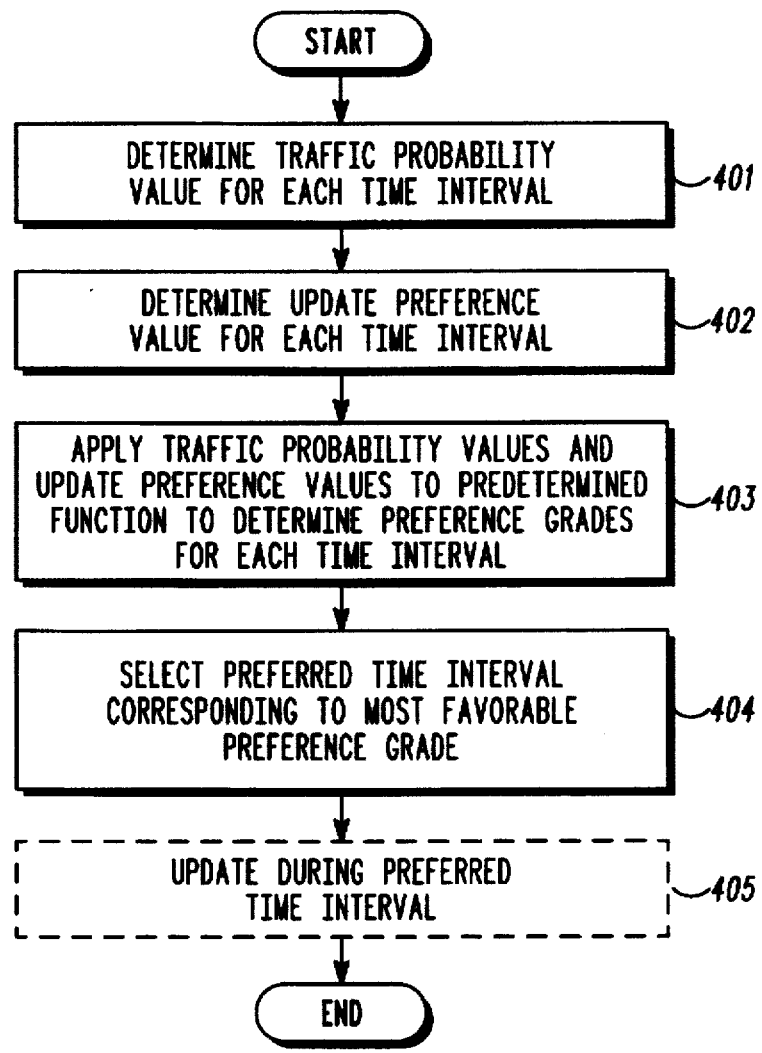
FIG. 4 is a flow chart illustrating an embodiment of the present invention.

FIG. 4 is a flow chart illustrating an embodiment of the present invention. The flowchart of FIG. 4 is preferably implemented using software algorithms stored and executed by the memory 116 and processor 118 of the key management controller 101. At step 401, a traffic probability value is determined, for a given communication unit, for each time interval of a plurality of time intervals. In one embodiment of the present invention, assumed hereinafter, the plurality of time intervals comprises four contiguous six-hour intervals: for example, Morning (6:00AM-Noon), Afternoon (Noon-6:00PM), Evening (6:00PM-Midnight), and Overnight (Midnight-6:00AM). It is understood that any number of different possible time intervals of equivalent or varying lengths could be used in accordance with the present invention.

In determining the traffic probability value for each time interval, the average amount of traffic for each communication unit in the System during each time interval is recorded. The term "traffic" is meant to encompass all instances which confirm that a given communication unit is in service, such as push-to-talks, rekey message requests, or acknowledgements of rekey messages. As this is done for each time interval, a rudimentary probability distribution is derived for each communication unit. Table 1 illustrates an example of traffic probability values for a four-unit system.

TABLE 1

|  | Morning | Afternoon | Evening | Overnight |
| --- | --- | --- | --- | --- |
| Unit 1 | 10% | 60% | 10% | 20% |
| Unit 2 | 30% | 10% | 10% | 50% |

TABLE 1-continued

|  | Morning | Afternoon | Evening | Overnight |
| --- | --- | --- | --- | --- |
| Unit 3 | 0% | 15% | 85% | 0% |
| Unit 4 | 20% | 10% | 50% | 20% |

Referring to Table 1, 85% of the traffic for Unit 3, for example, occurs during the Evening time interval, thereby making it more likely that messages sent during that time interval will be properly received in comparison with all other time intervals.

At step 402, an update preference value for each time interval is determined. The determination of the update preference values can be performed at the time of system setup or can be performed each time a communication unit parameter needs to be updated. The update preference value for a time interval, as described below, reflects a relative preference for that interval in comparison with the other time intervals for the purposes of performing communication unit parameter updates. The determination of the update preference values is based on selections made corresponding to the update preference value, as described below with reference to FIG. 3.

Figure 3:
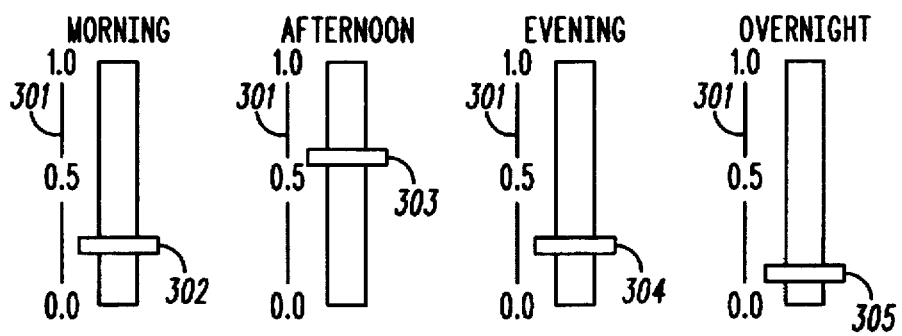
FIG. 3 illustrates an exemplary configuration for the selection of update preference values for a plurality of time intervals.

FIG. 3 illustrates an exemplary configuration for the selection of update preference values for the plurality of time intervals. In particular, sliding selectors 302–305 are provided for each time interval. In the example shown, there are four time intervals, as described above. The selectors 302–305 are provided as part of a user interface portion of the key management controller 101 and can be implemented using hardware, such as a rheostat arrangements, or software, such as a graphical user interface (GUI). The selectors 302–305 can be placed, by a user, anywhere within a value range 301, such that the sum of the values designated by the selectors 302–305 does not exceed the maximum value presented by the value range 301. Thus, when the value range varies from 0 to 1, inclusive, the sum of the values designated by the selectors 302–305 cannot exceed 1. This is illustrated in FIG. 3 where the selectors 302, 304 corresponding to the Morning and Evening time intervals, respectively, are set to values of 0.15; the selector 303 corresponding to the Afternoon time interval is set to a value of 0.6; and the selector 305 corresponding to the Overnight time interval is set to a value of 0.1. Of course, other limits on the value range 301 could also be used.

Regardless of the limits used, either extreme of the value range 301 corresponds to a relative preference for a time interval. In one embodiment, an update preference value of 0 corresponds to no preference for a time interval (i.e., that updates should never occur during that time interval) whereas an update preference value of 1 corresponds to a total preference for a time interval (i.e., that updates should occur exclusively during that time interval). Although this correspondence between values and preferences is arbitrary, and that other correspondences could be used equally, it shall be assumed hereinafter.

Referring again to FIG. 4, at step 403, the update preference values and the traffic probability values for each time interval are applied to a predetermined function to determine preference grades for each time interval. An example of the predetermined function is given by the following formulas, where the operator "Truth{statement}" calculates the relative truth of the statement on a scale from 0 (not true) to 1 (true), the operator "Area{statement}" calculates the area under a membership function defined by the statement, the operator "Centroid{statement}" calculates the center of an area under a membership function defined by the statement, "ti" represents a given time interval, "traf[ti]" is the traffic probability value for the given time interval, "pref[ti]" is the update preference value for the given time interval, and "best[ti]" is the conclusion that the given time interval is the best time interval. The use of membership functions and the operators described above are well understood in the art, particularly in applications dealing with so-called "fuzzy logic".

For each ti:

```
Truth{traf[ti] is Low}
=       1 - traf[ti]
Truth{pref[ti] is Low}
=       1 - pref[ti]
Truth{pref[ti] is Very Low}
=       (1-pref[ti])²
Truth{traf[ti] is High}
=       traf[ti]
Truth{pref[ti] is High}
=       pref[ti]
Truth{pref[ti] is Very High}
=       (pref[ti])²
Truth{best[ti] is Low}
=       (Truth{traf[ti] is Low} * Truth{pref[ti] is Low}) +
        Truth{pref[ti] is Very Low}
Truth{best[ti] is High}
=       (Truth{traf[ti] is High} * Truth{pref[ti] is High}) +
        Truth{pref[ti] is Very High}
Area{best[ti] is Low}
=       Truth{best[ti] is Low} - ((Truth{best[ti] is Low})²/2)
Area{best[ti] is High}
=       Truth{best[ti] is High} - ((Truth{best[ti] is High}²}/2)
Centroid{best[ti] is Low}
=       (2 - Truth{best[ti] is Low})/4
Centroid{best[ti] is High}
=       (2 + Truth{best[ti] is High})/4
Grade{best[ti]}
=       ((Centroid{best[ti] is Low} * Area{best[ti] is Low}) +
        (Centroid{best[ti] is High} * Area{best[ti] is High}))/
        (Area{best[ti] is Low} + Area{best[ti] is High})
```

At this point, "Grade{best[ti]}" is the preference grade for the given time interval. Those of ordinary skill in the art will recognize that other predetermined functions could be used to achieve similar results.

At step 404, having determined a preference grade for each time interval, a preferred time interval is selected. In particular, a time interval corresponding to a most favorable preference grade is selected as the preferred time interval. Determination of the most favorable preference grade is dependent upon the predetermined function. Using the pre- determined function described by the formulas given above, the most favorable preference grade is the preference grade having the highest value. Other predetermined functions can be derived such that the most favorable preference grade is the preference grade having the lowest value, or that meeting some other decision criteria. Table 2 illustrates preferred time intervals selected when the traffic probability values for the four-unit system of Table 1 and various values for the update preference values are applied to the predetermined function given above.

TABLE 2

|        | Scenario 1 | Scenario 2 | Scenario 3 |
|--------|-----------|-----------|-----------|
| Unit 1 | Afternoon | Afternoon | Evening   |
| Unit 2 | Overnight | Morning   | Evening   |
| Unit 3 | Evening   | Afternoon | Evening   |
| Unit 4 | Evening   | Morning   | Evening   |

In Scenario 1, the update preference values for the Morning, Afternoon, Evening, and Overnight time intervals are each 0.25 (i.e., no preference for one time interval over any others). As would be expected, the resulting preferred time intervals reflect the highest traffic probability value for each communication unit.

In Scenario 2, the update preference values for the Morning, Afternoon, Evening, and Overnight time intervals are 0.4, 0.4, 0.15, and 0.05, respectively. In this case, the Morning and Afternoon time intervals dominate as the preferred time intervals for the communication units.

In Scenario 3, the update preference values for the Morning, Afternoon, Evening, and Overnight time intervals are 0, 0, 1, and 0, respectively (i.e., complete preference for the Evening time interval). As a result, only the Evening time interval is selected as the preferred time interval.

Once a preferred time interval for the given communica- tion unit has been selected, updates of communication unit parameters for the given communication unit can be option- ally performed at step 405 during the preferred time interval. As discussed above, any of a number of methods can be used to perform updates of communication unit parameters. In a preferred embodiment, the method described in U.S. patent application Ser. No. 08/534,605 entitled METHOD FOR UPDATING A COMMUNICATION UNIT PARAMETER IN A WIRELESS COMMUNICATION SYSTEM is used to perform updates of communication unit parameters.

Although the present invention has been described above with respect to encryption keys and an encryption map index as used by a key management controller, those of ordinary skill in the art will recognize that the present invention can be incorporated for use in any system that performs updates of one or more communication unit parameters.

The present invention provides a method for selecting a preferred time interval in which to perform updates of communication unit parameters in a wireless communica- tion system. Using update preference values corresponding to a plurality of time intervals and traffic probability values corresponding to each of the time intervals, a preference grade for each time interval is determined. Consequently, the time interval corresponding to the most favorable preference grade is selected as the preferred time interval. This process can be repeated for each communication unit in the system. The preferred time interval chosen for each communication unit in this manner reflects the highest likelihood that an update message sent during the preferred time interval will be properly received. As such, the efficiency with which updates of communication unit parameters can be performed is enhanced.

We claim:

1. In a wireless communication system, a method for selecting a preferred time interval in which to update a communication unit parameter for at least one communica- tion unit, the method comprising steps of:

determining, for the at least one communication unit, a traffic probability value for each time interval of a plurality of time intervals;

determining an update preference value for each time interval of the plurality of time intervals;

applying the update preference value and the traffic prob- ability value for each time interval of the plurality of time intervals to a predetermined function to produce preference grades corresponding to the plurality of time intervals; and selecting the preferred time interval of the plurality of time intervals, wherein the preferred time interval cor- responds to a most favorable preference grade of the preference grades.

2. The method of claim 1, wherein the communication unit parameter further comprises at least one encryption key.

3. The method of claim 1, wherein the communication unit parameter further comprises an encryption map index.

4. The method of claim 1, further comprising the step of determining the traffic probability value for each time interval of the plurality of time intervals, wherein the plurality of time intervals comprises four contiguous six-hour intervals.

5. The method of claim 1, further comprising the step of determining the traffic probability value for each time interval of the plurality of time intervals, wherein the traffic probability value for each time interval of the plurality of time intervals is based on previous activity of the at least one communication unit.

6. The method of claim 1, further comprising the step of determining the traffic probability value for each time interval of the plurality of time intervals, wherein the traffic probability value is inclusively within the range 0 to 1.

7. The method of claim 6, further comprising the step of determining the update preference value for each time interval of the plurality of time intervals, wherein the update preference value is inclusively within the range 0 to 1.

8. In a key management controller that includes a processor, wherein the key management controller operates within a wireless communication system and controls encryption keys for a plurality of communication units within the wireless communication system, a method for updating at least one encryption key for at least one communication unit of the plurality of communication units during a preferred time interval, the method comprising steps of:

determining, for the at least one communication unit, a traffic probability value for each time interval of a plurality of time intervals based on previous activity of the at least one communication unit;

determining an update preference value for each time interval of the plurality of time intervals;

applying the update preference value and the traffic probability value for each time interval of the plurality of time intervals to a predetermined function to produce preference grades corresponding to the plurality of time intervals;

selecting the preferred time interval of the plurality of time intervals, wherein the preferred time interval corresponds to a most favorable preference grade of the preference grades; and updating the at least one encryption key for the at least one communication unit, via the wireless communication system, during the preferred time interval.

9. The method of claim 8, further comprising the step of determining the traffic probability value for each time interval of the plurality of time intervals, wherein the plurality of time intervals comprises four contiguous six-hour intervals.

10. The method of claim 8, further comprising the step of determining the traffic probability value for each time interval of the plurality of time intervals, wherein the traffic probability value is inclusively within the range 0 to 1.

11. The method of claim 10, further comprising the step of determining the update preference value for each time interval of the plurality of time intervals, wherein the update preference value is inclusively within the range 0 to 1.

* * * * *